United States Patent
Pimpinella et al.

(10) Patent No.: US 8,488,115 B2
(45) Date of Patent: *Jul. 16, 2013

(54) METHOD AND METRIC FOR SELECTING AND DESIGNING MULTIMODE FIBER FOR IMPROVED PERFORMANCE

(71) Applicant: Panduit Corp., Tinley Park, IL (US)

(72) Inventors: Richard J. Pimpinella, Frankfort, IL (US); Gaston E. Tudury, Lockport, IL (US)

(73) Assignee: Panduit Corp., Tinley Park, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/667,041

(22) Filed: Nov. 2, 2012

(65) Prior Publication Data

US 2013/0070237 A1    Mar. 21, 2013

Related U.S. Application Data

(63) Continuation of application No. 12/797,328, filed on Jun. 9, 2010.

(60) Provisional application No. 61/187,137, filed on Jun. 15, 2009.

(51) Int. Cl.
    *G01N 21/00*      (2006.01)

(52) U.S. Cl.
    USPC ........................................................ 356/73.1

(58) Field of Classification Search
    USPC ........................................................ 356/73.1
    See application file for complete search history.

(56) References Cited

U.S. PATENT DOCUMENTS

| | | | |
|---|---|---|---|
| 4,067,642 A | 1/1978 | King et al. | |
| 4,204,745 A | 5/1980 | Sakai et al. | |
| 4,217,027 A | 8/1980 | MacChesney et al. | |
| 4,298,365 A | 11/1981 | Bailey et al. | |
| 4,339,174 A | 7/1982 | Levin | |
| 4,793,843 A | 12/1988 | Pluijms et al. | |
| 5,729,645 A | 3/1998 | Garito et al. | |
| 6,292,612 B1 | 9/2001 | Golowich et al. | |

(Continued)

FOREIGN PATENT DOCUMENTS

| | | |
|---|---|---|
| EP | 2144096 A1 | 1/2010 |
| WO | 2009054715 A1 | 4/2009 |

OTHER PUBLICATIONS

"Development of System Specification for Laser-Optimized 50-μm Multimode Fiber for Multigigabit Short-Wavelength LANs"; Journal of Lightwave Technology, vol. 21, No. 5, May 2003, 20 pages.

(Continued)

*Primary Examiner* — Tara S Pajoohi Gomez
(74) *Attorney, Agent, or Firm* — Christopher S. Clancy; Zachary J. Smolinski; Yuri Astvatsaturov

(57) ABSTRACT

A new metric applicable to the characterization and design of multimode fiber (MMF) is described. The metric is derived from a Differential Mode Delay (DMD) measurement and when used in combination with industry-standard metrics such as Effective Modal Bandwidth (EMB) and DMD, yields a more accurate prediction of MMF channel link performance as measured by Bit Error Rate (BER) testing. The metric can also be used in the design of MMF for improved bandwidth performance. When implemented as a test algorithm in production, it can be used to select, sort, or verify fiber performance. This process can yield a multimode fiber design with a greater performance margin for a given length, and/or a greater length for a given performance margin.

4 Claims, 14 Drawing Sheets

U.S. PATENT DOCUMENTS

| | | |
|---|---|---|
| 6,400,450 B1 | 6/2002 | Golowich et al. |
| 6,490,396 B1 | 12/2002 | Smith |
| 6,510,265 B1 | 1/2003 | Giaretta et al. |
| 6,574,403 B1 | 6/2003 | Golowich et al. |
| 6,718,800 B2 | 4/2004 | Mazzarese et al. |
| 6,990,277 B2 | 1/2006 | White |
| 7,043,126 B2 | 5/2006 | Guan et al. |
| 7,095,940 B2 | 8/2006 | Hayami et al. |
| 7,116,877 B2 | 10/2006 | Kuijpers et al. |
| 7,646,955 B2 | 1/2010 | Donlagic |
| 7,995,888 B2 | 8/2011 | Gholami et al. |
| 2010/0028020 A1 | 2/2010 | Gholami et al. |
| 2010/0142969 A1 | 6/2010 | Gholami et al. |
| 2010/0171945 A1 | 7/2010 | Gholami et al. |

OTHER PUBLICATIONS

"Modal Bandwidth Enhancement in a Plastic Optical Fiber by W-Refractive Index Profile"; Journal of Lightwave Technology, vol. 23, No. 4, Apr. 2005, 9 pages.

Multimode Fibers Optimized for High Speed, Short Reach Interconnects, 33rd European Conference and Exhibition on Optical Communication, Sep. 2007, 4 pages.

METHOD AND METRIC FOR SELECTING AND DESIGNING MULTIMODE FIBER FOR IMPROVED PERFORMANCE

CROSS-REFERENCE TO RELATED APPLICATION

This application is a continuation of U.S. patent application Ser. No. 12/797,328, filed Jun. 9, 2010, which claims priority to U.S. Provisional Patent Application Ser. No. 61/187,137, filed Jun. 15, 2009, and incorporates in its entirety U.S. patent application Ser. No. 12/627,752, filed Nov. 30, 2009, entitled "Multimode Fiber Having Improved Index Profile".

BACKGROUND

The performance of multimode fiber (MMF) is largely governed by the amount of dispersion a pulse undergoes as it propagates through the fiber. Dispersion is the broadening of discrete data bits or "symbols" as the bits propagate through a media. Dispersion results in an overlap between adjacent data bits causing an increase in the uncertainty that a bit will be interpreted as a logic 0 or 1. This uncertainty in logic state can be quantified in terms of bit error rate (BER), where the BER is defined as the number of bit errors divided by the total number of bits transmitted in a given period of time. For high-speed Ethernet, the BER cannot exceed 1 error bit for every 1 trillion bits transmitted (BER<$10^{-12}$). Modal dispersion results from the difference in propagation velocities between the various modes traversing the optical fiber. Since the optical power is carried by the sum of the discrete modes, as the modes spread in time the optical power of the pulse disperses. Modal dispersion is expressed in terms of Differential Mode Delay (DMD), which is a measure of the difference in pulse delay (ps/m) between the fastest and slowest modes traversing the fiber.

The index of refraction of a material represents the amount by which the speed of light is reduced within the material, as compared to the speed of light in a vacuum. Since the refractive index of a material, normally given the abbreviation "n," is wavelength-dependent (that is, the index is a function of wavelength, which can be written as "n(λ)") the velocity of light in a material is also wavelength-dependent, and the velocity as a function of wavelength is related to the wavelength dependence of the index of refraction by, $$v(\lambda) = \frac{c}{n(\lambda)}$$

where c is the speed of light in vacuum (299,792,458 meters/second).

Hence, a pulse of light having a finite spectral width will also undergo wavelength dispersion as it propagates through a material. This is called chromatic dispersion. In multimode fiber, modal dispersion is typically much larger than chromatic dispersion, however in high-bandwidth MMF (>8000 MHz·km), chromatic dispersion begins to dominate. It follows that by reducing the dispersion in MMF, the performance of the fiber will increase.

Using a BER test bench, it has been discovered that current industry-standard fiber performance metrics do not accurately predict the fiber's system performance. In FIG. 1, the BER channel performance is shown as a function of the calculated Effective Modal Bandwidth (EMBc) for 81 300 m high-bandwidth MMF's. In order to compare bit error rates, we measure the BER at a reference optical power level of −11.0 dBm. It is important to note that the BER test bench employed in these tests simulates worst-case conditions for a 10 GBASE-SR Ethernet link. The calculated Effective Modal Bandwidth (EMBc) values were determined from DMD measurements and are related to the Effective Modal Bandwidth (EMB) by a factor of 1.13 (i.e., EMB=1.13×EMBc).

The data show a poor correlation between EMBc (or EMB) and BER. We find that for a nominal EMBc of 2000 MHz·km, the BER performance of a MMF can vary by more than 4 orders of magnitude. At the reference optical power level, a BER greater than 2E-08 is considered a channel failure. The data show that many fibers will not support 10 Gb/s Ethernet transmission to the specified maximum channel length of 300 m. Because most channel links in the data center do not approach the maximum reach limit, system failures have not been widely observed. However, several fiber-related channel failures have been reported.

DESCRIPTION OF THE INVENTION

A new metric "DMD Shift" is derived from a DMD measurement. The DMD shift can be used as a scaling factor for industry-standard EMB and DMD metrics to yield a more accurate prediction of a multimode fiber's Bit Error Rate (BER) channel link performance. The metric can be related to the refractive index profile in MMF and can, therefore, be used to optimize the design of MMF to achieve improved performance. When implemented as a test algorithm in production, it can be used to select fiber, sort fiber, or verify fiber performance. MMF compliant with this new metric will result in higher BER system performance for a given cable length, or allows a greater cable length for a given BER system performance.

In optical systems the fiber dispersion is typically included as a component of the Inter-symbol Interference (ISI) penalty of the link. Therefore, a reduction in the modal dispersion penalty results in a reduction in ISI penalty. By selecting fibers with the appropriate DMD shift metric, a reduction in ISI can be realized and improved link margin can be achieved. This increase in margin can be deployed into links with additional operating distance, additional connectivity, or simply additional margin that provides increased reliability, all of which provide design flexibility. The DMD shift metric is also related to the refractive index profile of the fiber and therefore, it can be used to optimize the design of MMF.

Figure 1:
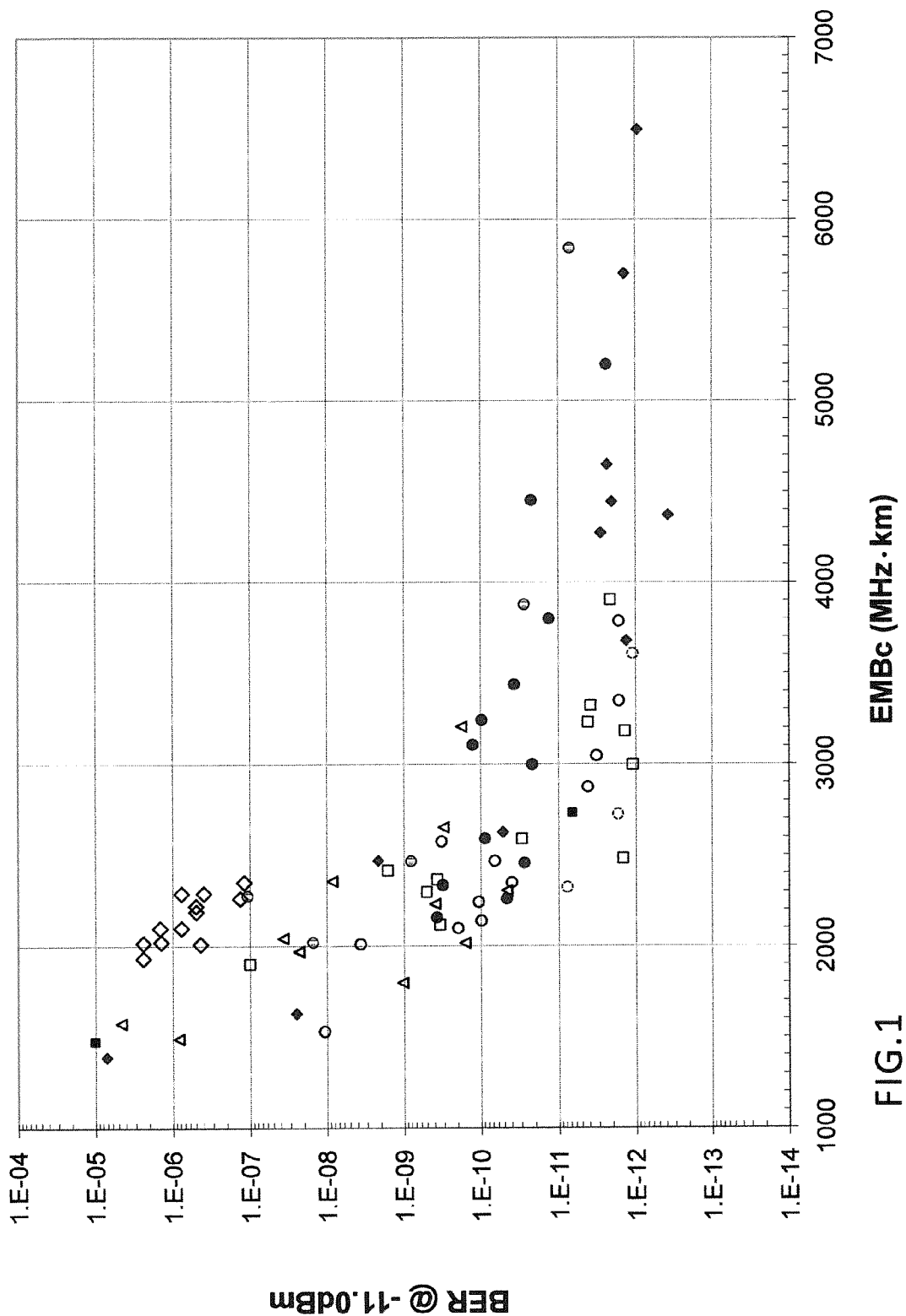
FIG. 1 is a graph of bit error rate channel performance as a function of the calculated effective modal bandwidth for eighty-one 300 m high-bandwidth multimode fibers.
Figure 2A:
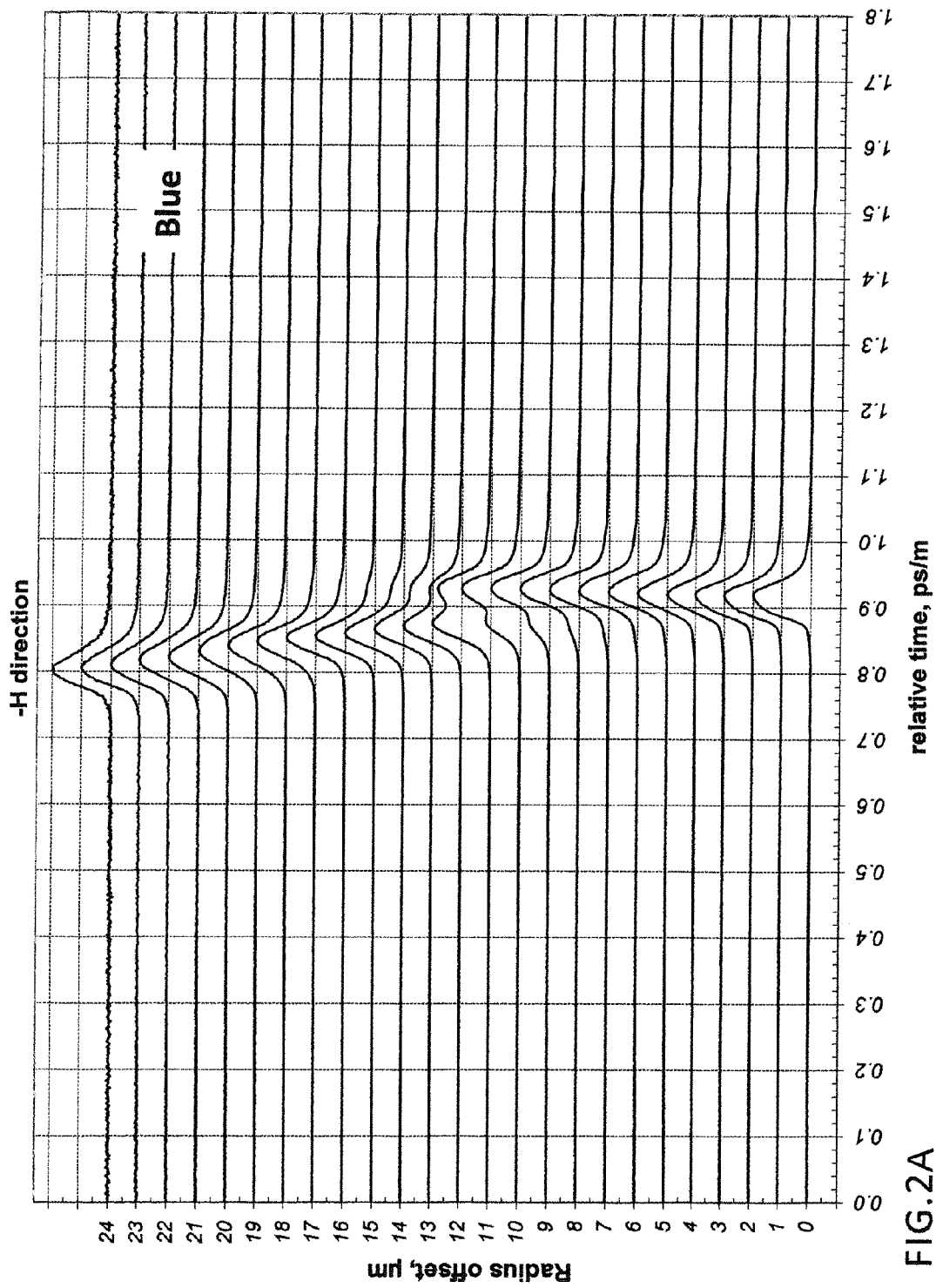
FIGS. 2A and 2B show plots of DMD waveforms for two multimode fibers.
Figure 2B:
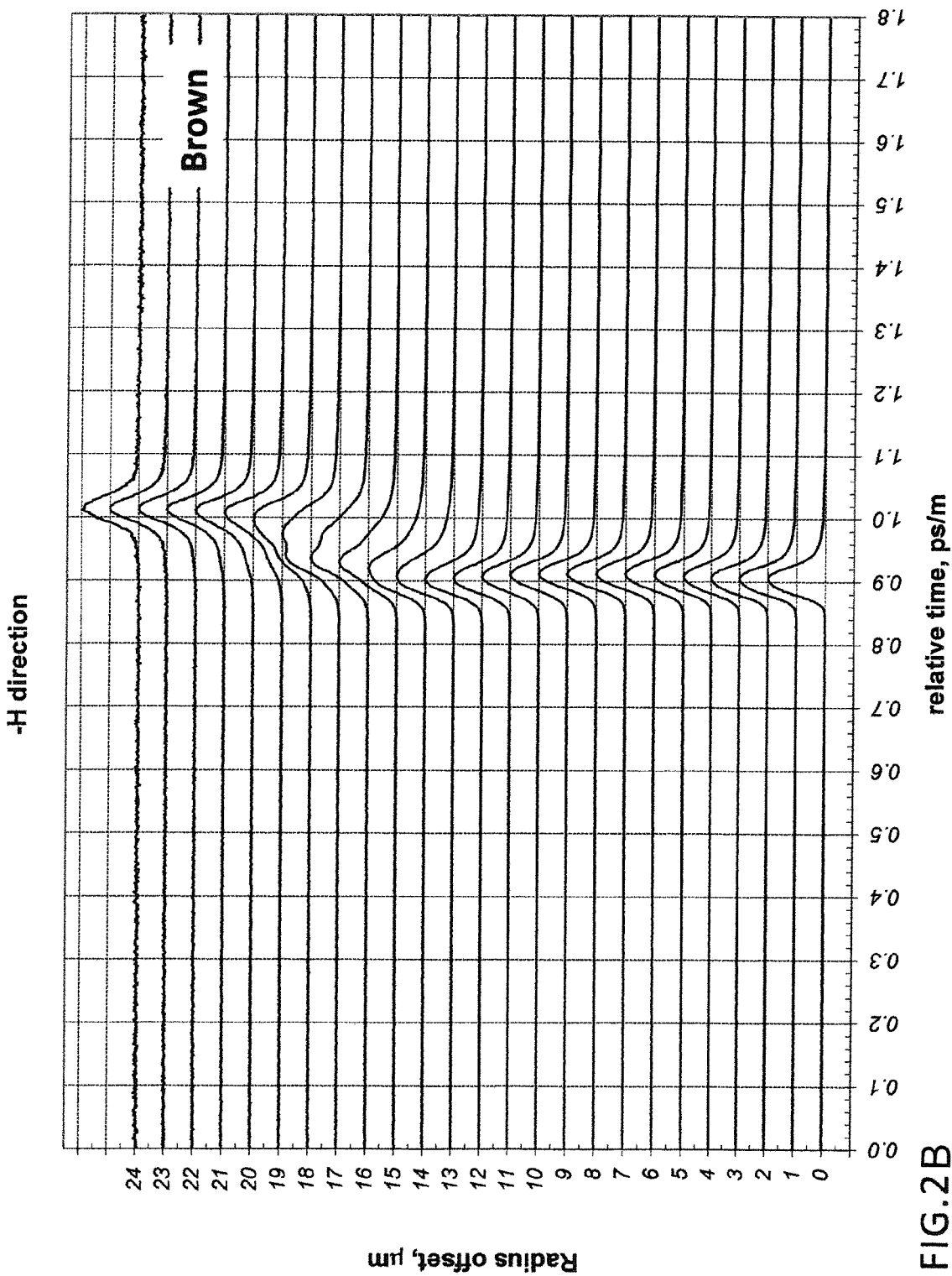

In FIGS. 2A and 2B, we plot the DMD waveforms for two OM3 mMF's using the industry standard test method specified in TIA-455-220A. In this method an optical reference pulse emitted from the end of a single-mode launch fiber is stepped across the core of a MMF under test. For each lateral offset across the core (0 to 24 microns), the propagation delay of the resultant output pulse is recorded. Each output pulse contains only those modes excited at a given input radial position. The output waveforms for each of the radial offsets are plotted along the vertical axis and are displaced by 1 micron increments. The relative pulse delay for each waveform is plotted along the horizontal axis in units of picoseconds per meter (ps/m). The DMD is determined by first measuring the difference in pulse delay using the leading edge of the fastest pulse and the trailing edge of the slowest pulse. From this difference we subtract the temporal width of the launch pulse which yields the modal dispersion of the fiber. In Table 1, we list the DMD measurements for two specified regions in the core as defined in TIA-455-220A, 5-18 microns (inner mask) and 0-23 microns (outer mask). Knowing the input and output temporal waveforms in the time domain, we can calculate the Effective Modal Bandwidth (EMBc) of a fiber in units of MHz·km in the frequency domain.

Smaller values along on the horizontal axis (ps/m) correspond to higher velocities. Therefore, waveform peaks that shift to the left correspond to higher mode velocities. For higher order modes to travel faster, the refractive index must deviate from the previously assumed ideal index profile (where all waveforms aligned in time).

These two sample fibers, identified as "blue" and "brown," were shipped within the same optical cable and according to standard test methods, have essentially the same DMD and EMB values. In Table 1, we list the test results, which show the two fibers are virtually identical. The largest difference is found in the outer mask DMD, which indicates the brown fiber has lower modal dispersion.

TABLE 1

| Fiber | Inner Mask DMD (5 to 18 microns) | Outer Mask DMD (0 to 23 microns) | EMB (EMB = 1.13 × EMBc) |
|---|---|---|---|
| Blue | 0.122 ps/m | 0.145 ps/m | 4540 MHz * km |
| Brown | 0.124 ps/m | 0.132 ps/m | 4540 MHz * km |

Figure 3:
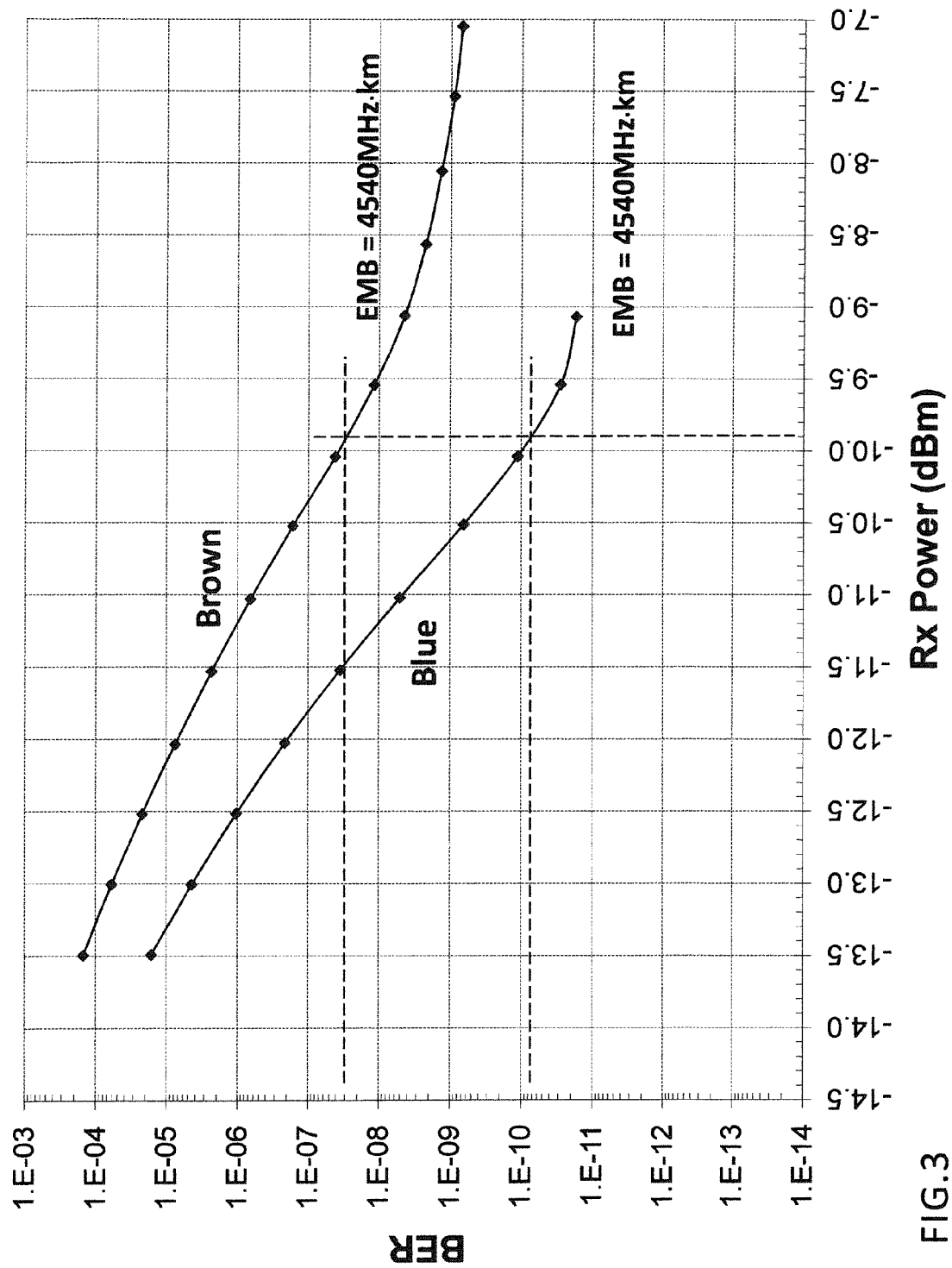
FIG. 3 is a graph of bit error rate system test results for two multimode fibers.

Based on these DMD and EMB measurements, these two fibers should perform equally well. In FIG. 3, BER system test results for the blue and brown fibers are shown. The measured performance data shows that for a received optical power of −9.9 dBm (minimum received optical power for 10 Gb/s Ethernet), the BER of the brown fiber is more than two orders of magnitude worse than the blue fiber.

Figure 4A:
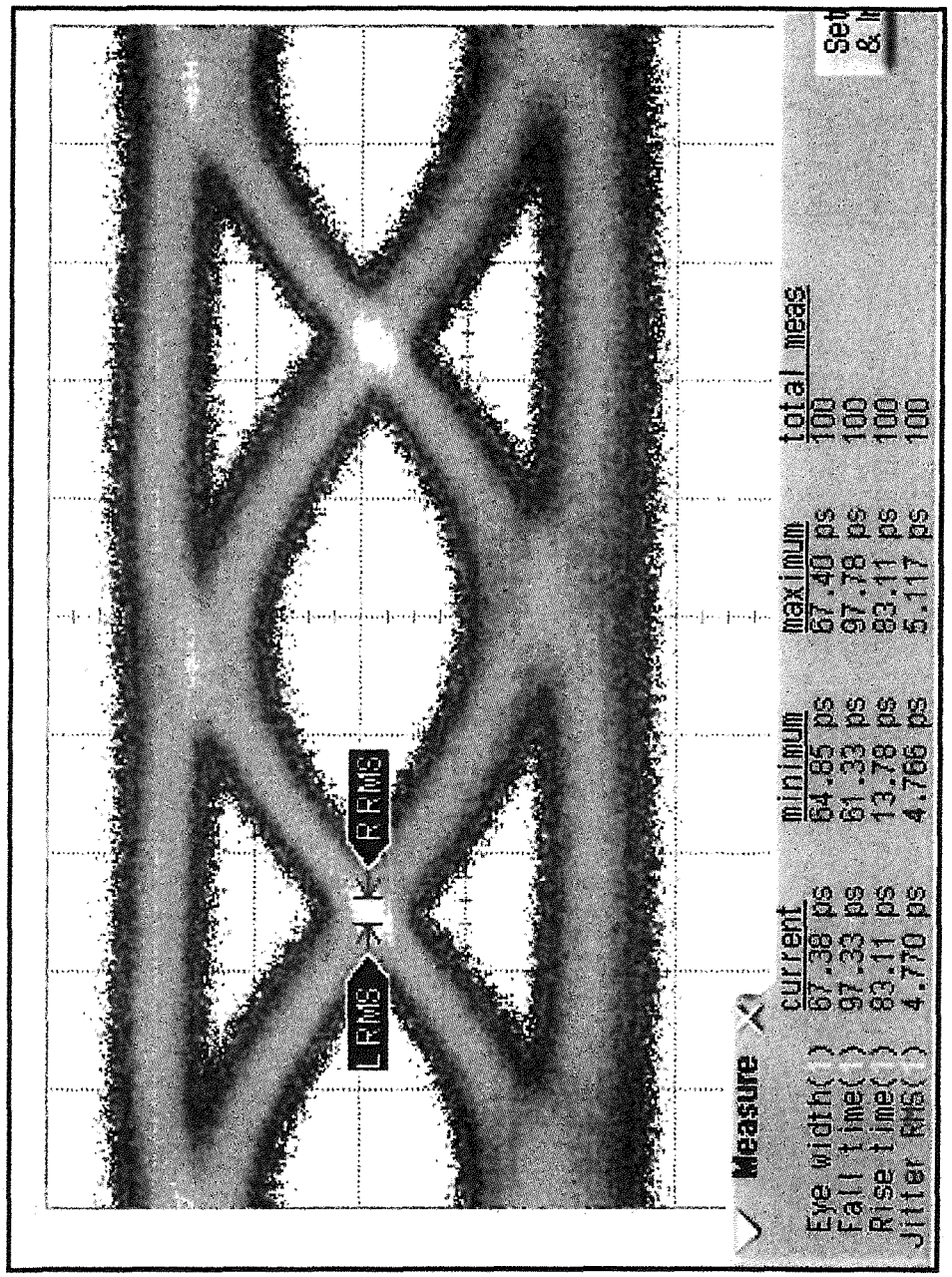
FIGS. 4A and 4B show eye diagrams for two multimode fibers, illustrating the signal-to-noise ratios of the fibers.
Figure 4B:
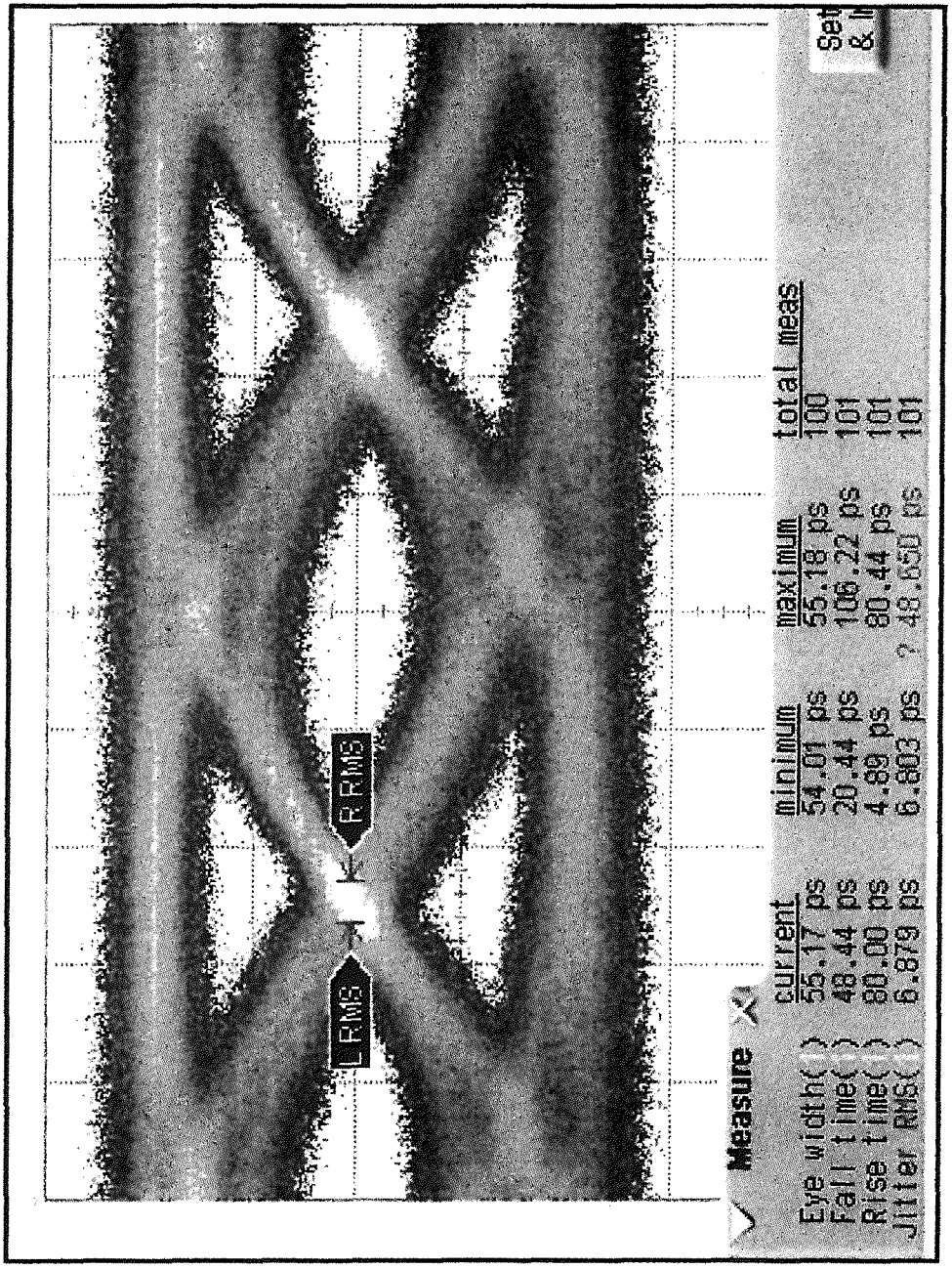

The eye-diagrams for these two fibers are shown in FIGS. 4A and 4B. An eye-diagram depicts the superposition of the various combinations of logic 0's and 1's in a pseudo-random binary sequence and is captured using an oscilloscope. The opening of the eye is a measure of the signal-to-noise ratio of the signal. The brown fiber shows significantly more eye closure than the blue fiber, which indicates the brown fiber has a lower signal-to-noise ratio which translates to higher BER. We can conclude the brown fiber introduces a larger ISI penalty in spite of the fact the bandwidths of these two fibers are identical.

This difference can be attributed to the shift in the refractive index profile as described in U.S. patent application Ser. No. 12/627,752, entitled "Multimode Fiber Having Improved Index Profile." The shift in the index profile is indicated in the radial DMD measurement of the two DMD plots for the blue and brown fibers, shown in FIGS. 2A and 2B, respectively. Extensive analysis of DMD plots and BER system test results shows a good correlation between the waveform shifts in the DMD plots and BER performance. However, a metric is needed to quantify this shift.

Due to the complexity of many DMD plots, an accurate and reliable DMD shift metric can be difficult to identify. However, it is sufficient to take the difference between the maximum peak pulse delays of the 19 micron and 5 micron lateral offset waveforms. The offsets were chosen so that the sign of the metric corresponds to the direction of the shift in the DMD plot, (negative to the left and positive to the right). These two points are also related to the optical power distribution of Vertical Cavity Surface Emitting Lasers (VCSELs), i.e., the encircled flux of light sources. Clearly, other similar metrics can be identified that can equally predict the shift, but the following simple metric works surprisingly well.

DMD Shift=(Peak delay at 19 μm)−(Peak delay at 5 μm)

To demonstrate the ability of this metric to predict fiber performance, we consider several of the high-performance MMF's listed in Table 2. We note the minimum EMB for a fiber to qualify as OM4 is 4700 MHz·km. These fibers, with the exception of the Green fiber, were determined to be OM4. Therefore, they should support low error rate transmission (<2E-08) up to 550 m at a received optical power of −11.0 dBm (based on statistical data acquired over 5 years).

TABLE 2

| Fiber Color | EMB (MHz * km) | DMD Shift (ps/m) |
|---|---|---|
| Violet | 6554 | 0.033 |
| Red | 5731 | 0.008 |
| Brown | 5241 | 0.065 |
| Black | 4831 | 0.068 |
| Yellow | 7013 | 0.008 |
| Aqua | 5981 | 0.042 |
| White | 5539 | −0.039 |
| Slate | 5061 | −0.021 |
| Rose | 5669 | −0.034 |
| Orange | 5361 | −0.061 |
| Green | 4286 | −0.074 |
| Blue | 5059 | −0.021 |

Figure 5:
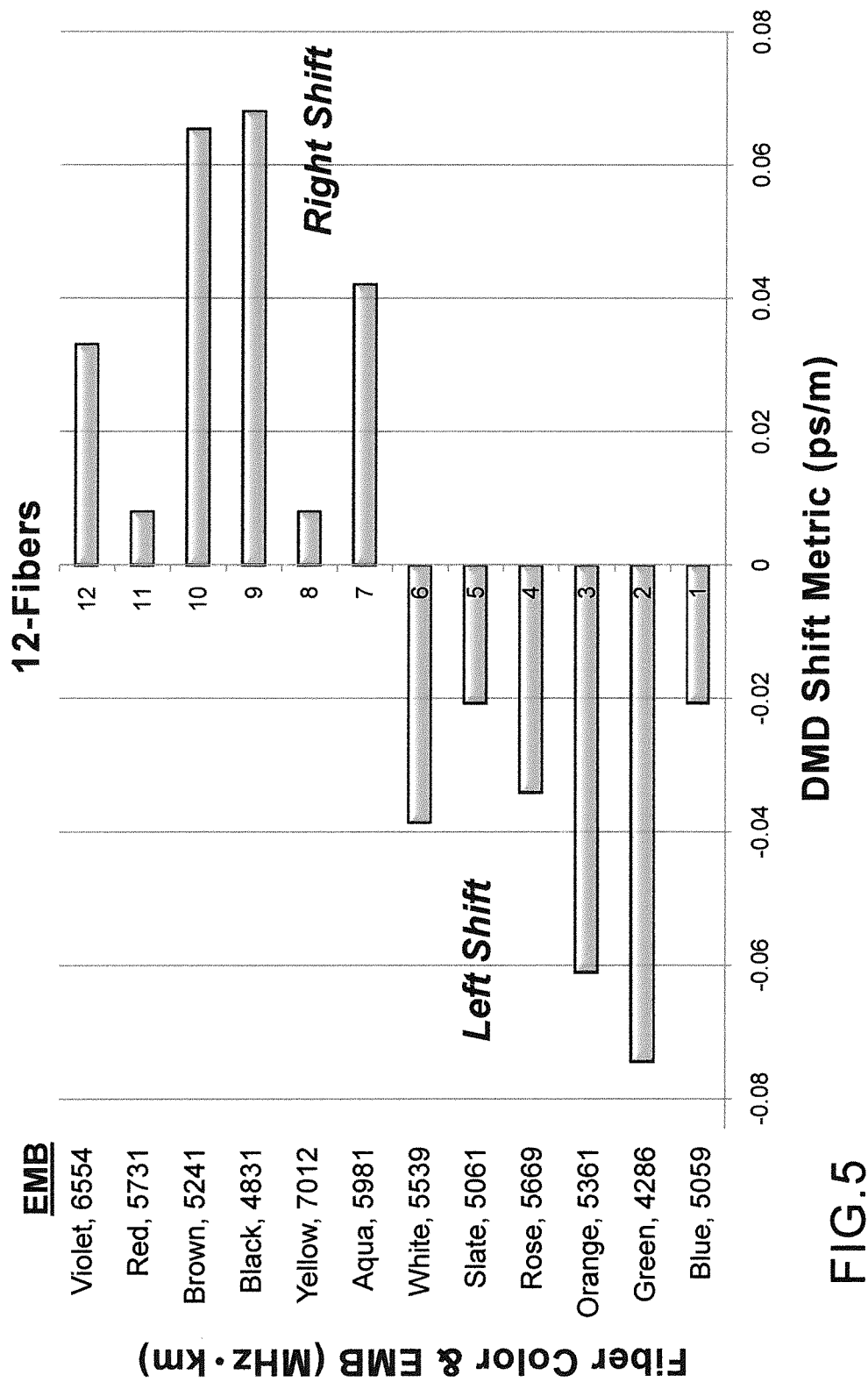
FIG. 5 is an illustration of a DMD shift metric for twelve multimode fibers.

The DMD Shift metric for each of the 12 fibers is graphically illustrated in FIG. 5.

Figure 6:
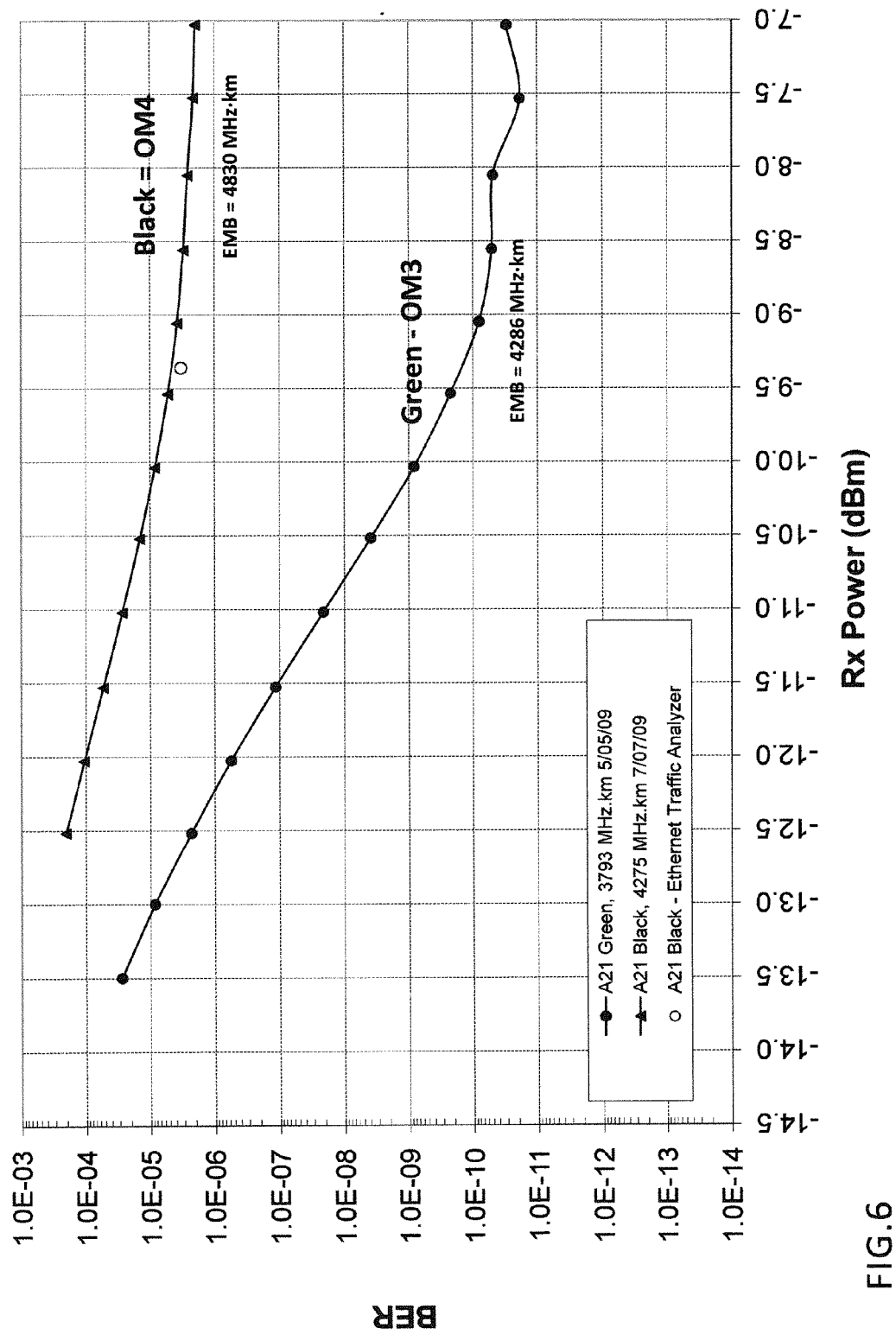
FIG. 6 is a graph showing the bit error rate performance for two multimode fibers.
Figure 7:
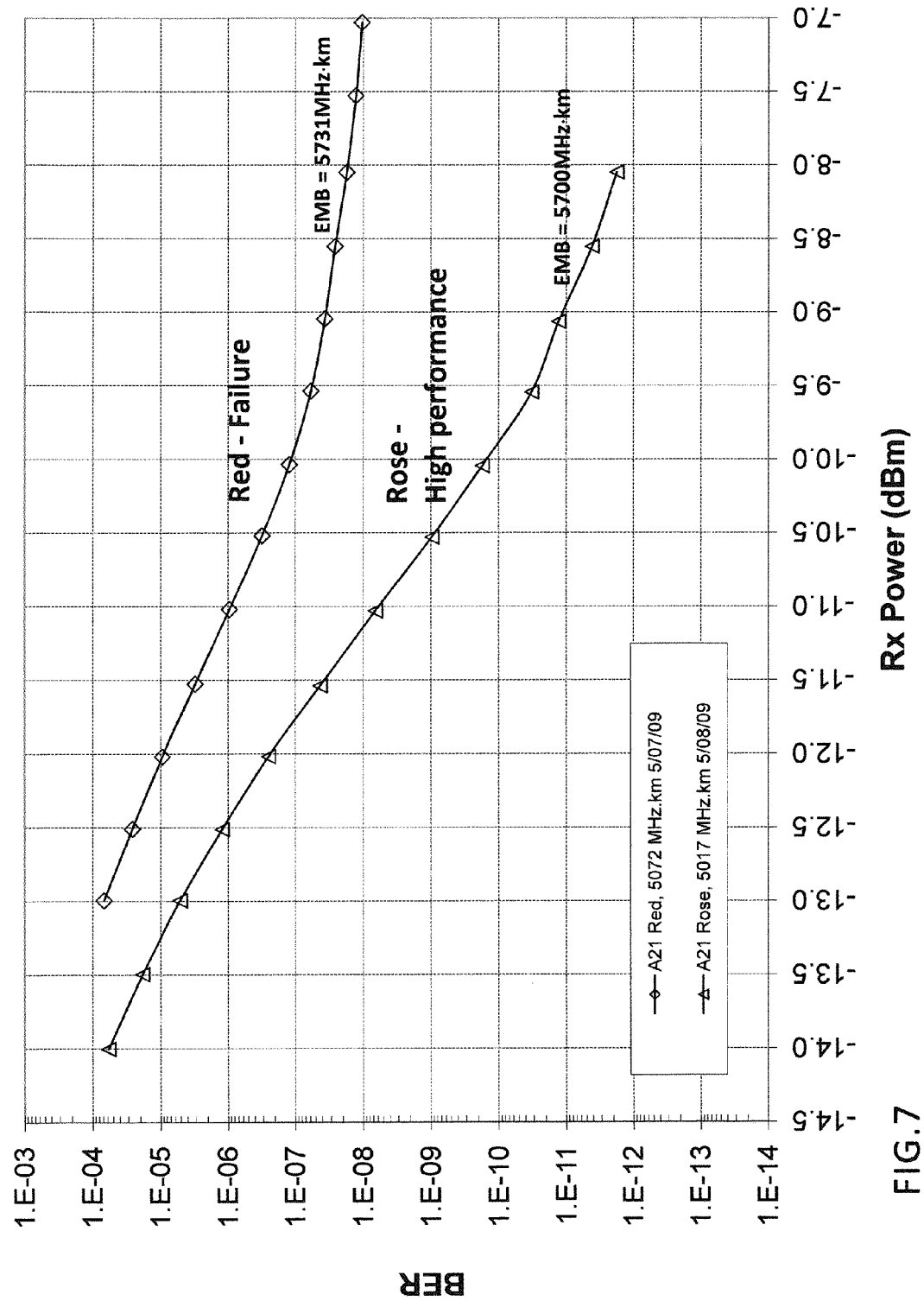
FIG. 7 is a graph showing the bit error rate performance for two multimode fibers.

All fibers having a positive DMD shift metric correspond to a pulse delay waveform that shifts to the right in the DMD plot. In observed cases of a positive DMD shift, a lower than expected BER performance is measured, and in many cases the fibers fail to meet system performance levels although their EMB and DMD metrics indicate they should pass. Using the measured EMB and our proposed DMD Shift metric we can make the following predictions: Refer to FIGS. 6 and 7.

1. The black fiber has a measured EMB of 4831 MHz km and is therefore certified as OM4. However, because the EMB is only marginally higher than 4700 MHz·km, the positive DMD shift degrades BER performance and the fiber fails the system-level test. The single red filled data point was obtained using an Ethernet traffic analyzer and verifies the system failure.
2. The Green fiber has EMB of 4286 MHz km and consequently, it is classified as OM3. But because it exhibits a large negative DMD shift the fiber passes BER system test.
3. The Red and Rose fibers are both OM4 and have similar EMB values, but the Red fiber has a positive DMD shift whereas, the Rose fiber has a negative DMD shift. As a result, the Red fiber fails BER system test while the Rose fiber passes.

This type of analysis was performed on 41 fibers with positive and negative DMD shifts. As a result, fiber system performance can be predicted with sufficient accuracy.

Figure 8:
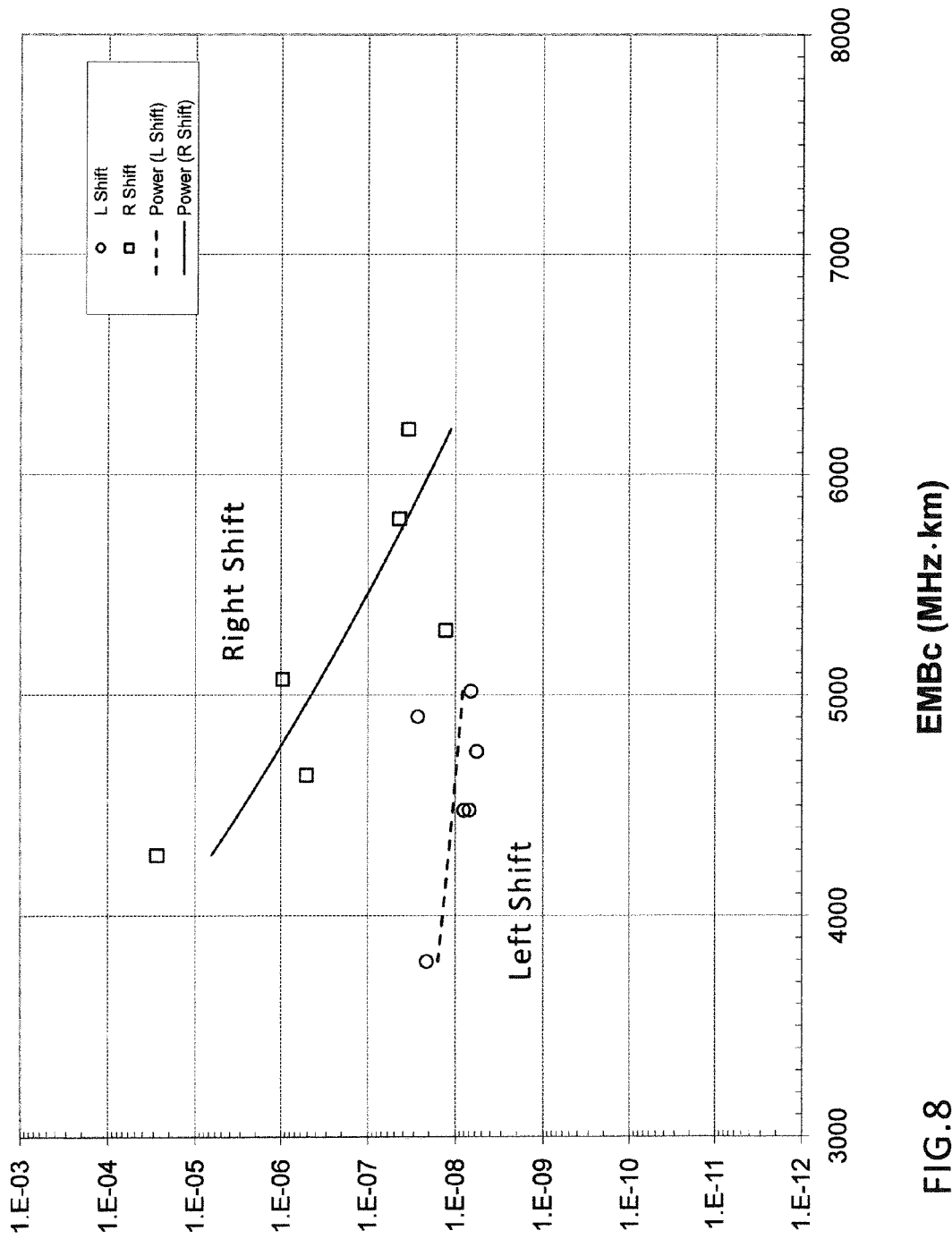
FIG. 8 is a graph showing the bit error rate performance for twelve multimode fibers for a reference optical power level of −11.0 dBm.

In FIG. 8, the BER performance for the 12 fibers listed in Table 2 is plotted, for a reference optical power level of −11.0 dBm. The green filled data symbols represent those fibers having a negative DMD shift metric. The red filled data symbols are those fibers having a positive DMD shift metric. The negative DMD shift fibers exhibit lower BER's overall and significantly outperform the positive DMD shifted fibers.

Figure 9:
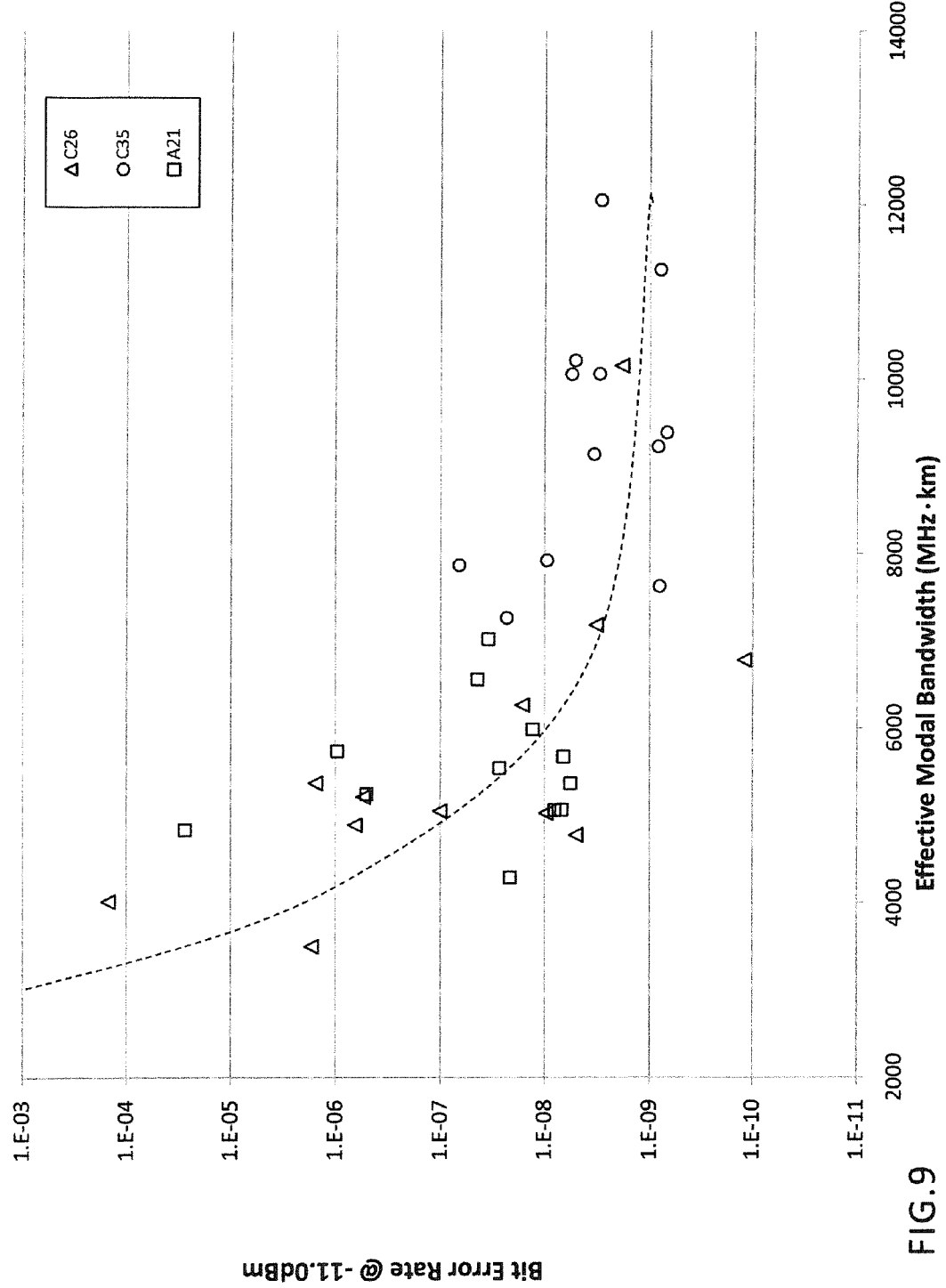
FIG. 9 is a graph of bit error rate versus EMB for thirty-six multimode fibers.
Figure 10:
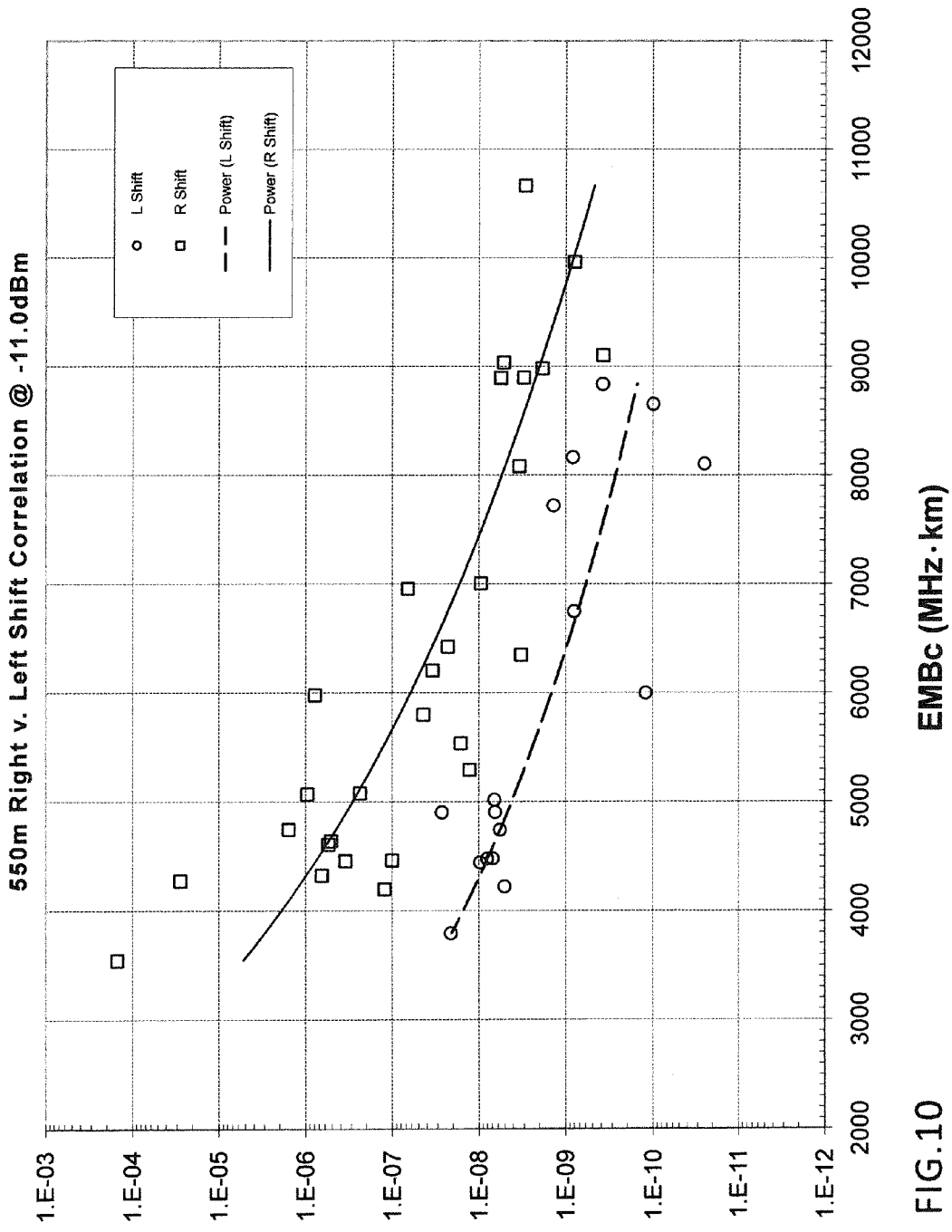
FIG. 10 is a graph showing the bit error rate performance of "left shift" versus "right shift" fibers.

In FIG. 9, this analysis is extended to 36 OM4 fibers from two fiber manufactures, and the dashed line is a fit of the data points. By measuring the DMD shift we can sort these fibers into two groups as shown in FIG. 10 (several different fibers are included in FIG. 10). The negative DMD shifted fibers clearly show improved performance over the positive DMD shifted fibers.

Figure 11:
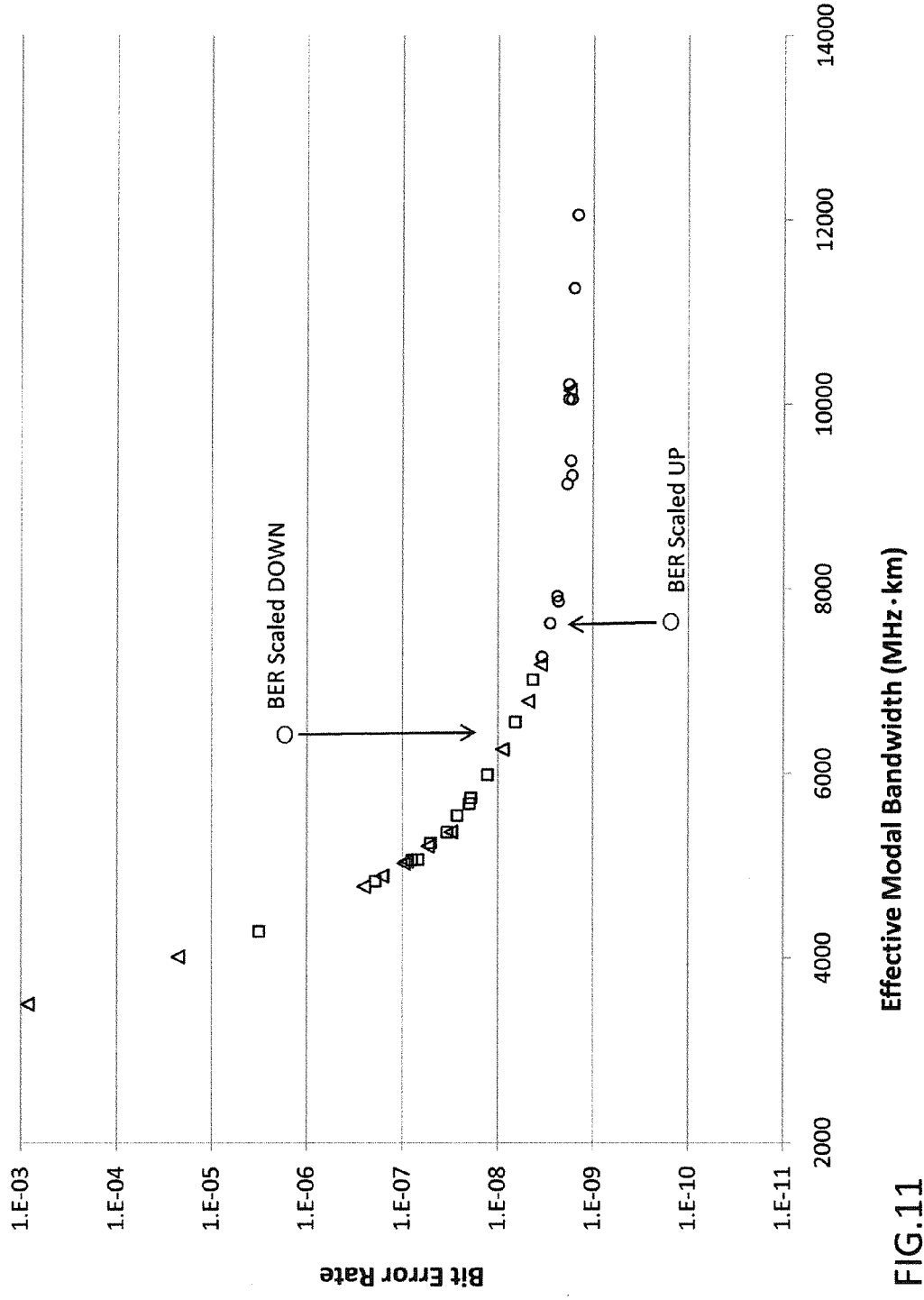
FIG. 11 is a graph showing shifted bit error rate data points for the fibers having the performance shown in FIG. 9 as scaled to a fitted line.
Figure 12:
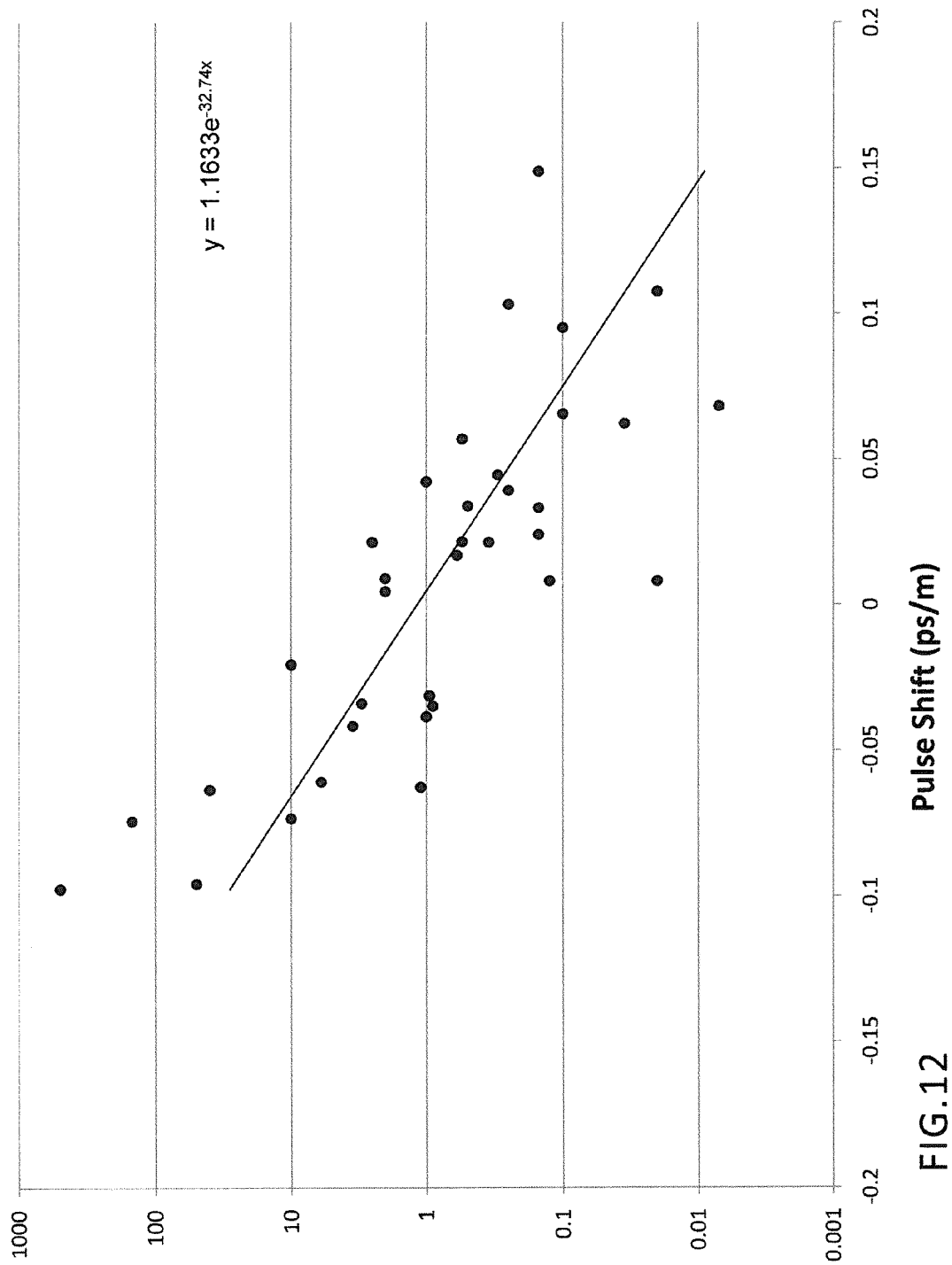
FIG. 12 is a graph showing the bit error rate multiplication factors for the fibers having the performance shown in FIG. 9 as a function of the DMD shift metric.

By scaling the BER for each of the fibers in FIG. 9 to a fitted line, a first order approximation of the improvement or degradation in fiber performance can be acquired. For each fiber, the multiplication factor required to scale the measured BER to the fitted line is determined. The spread in data is a result of measurement uncertainty, additional fiber defects, and second-order effects such as modal noise, mode partition noise, and possibly polarization noise. FIG. 11 shows the shifted BER data points, and FIG. 12 shows the BER multiplication factors for each of the fibers as a function of the DMD shift metric.

Negative DMD shifted fibers (DMD shifts to the left) have large scaling factors, which means the bit error rates are small and need to be scaled up, whereas positive DMD shifted fibers (DMD shifts to the right) have fractional scaling factors meaning they have large BER's that need to be scaled down. Close examination of the plot reveals a unity scaling factor for zero shift. This result implies an ideal refractive index profile, as formerly understood, might not yield the best system performance. It is important to note that most fibers fall short of perfection and therefore, exhibit either a left or right shift in the DMD profile. These results suggest a negative (left shift) DMD metric might improve performance beyond current predictions. This notion is supported by the fact that negative DMD shifted OM3 fibers with EMB values less than 4700 MHz*km exhibit exceedingly high BER performance.

We also observe the BER scaling factor is proportional to the DMD shift metric so that larger shifts have larger affects on the fiber.

Based on this data, an estimate of the improved channel link performance can be derived, which can be used to extend the reach of OM4 fiber for 40G and 100G Ethernet applications. This new DMD shift metric provides the means of developing very high performance MMF.

While one metric for the DMD shift has been explained, above, other metrics may be useful. For example, peak delays at 20 μm minus peak delays at 5 μm may provide a useful metric for the DMD shift, as may a variety of other shifts separated by similar intervals (such as 14 or 15 μm of separation). In other embodiments, negative shifts at any radial point may be used as a metric in a method for designing or selecting cable. The refractive index profile of a fiber optic core within a cladding may be selected based on a negative pulse shift (that is, a negative-going DMD shift) for a differential mode delay measurement.

The invention claimed is:

1. A method for selecting multimode optical fiber for use in a communications network, said method comprising:
    measuring a pulse delay for pulses traveling through different radii of a number of multimode optical fibers;
    subtracting the pulse delay at a first radius of each multimode optical fiber from the pulse delay at a second, larger radius of each multimode fiber; and
    choosing for use in the communications network those optical fibers in which the result of subtracting the pulse delay at the first radius from the pulse delay at the second radius is a negative number.

2. The method of claim 1 wherein said first radius is 5 μm and said second radius is 19 μm.

3. The method of claim 1 wherein said first radius is 5 μm and said second radius is 20 μm.

4. The method of claim 1 wherein said first radius and said second radius are 14 μm to 15 μm apart.

* * * * *

UNITED STATES PATENT AND TRADEMARK OFFICE
CERTIFICATE OF CORRECTION

| | | |
|---|---|---|
| PATENT NO. | : 8,488,115 B2 | Page 1 of 1 |
| APPLICATION NO. | : 13/667041 | |
| DATED | : July 16, 2013 | |
| INVENTOR(S) | : Richard J. Pimpinella et al. | |

It is certified that error appears in the above-identified patent and that said Letters Patent is hereby corrected as shown below:

In the Specification

Col. 3, line 15: Error reads as "... OM3 mMF's ..."; patent should read as "... OM3 MMF's ..."

Signed and Sealed this
Thirtieth Day of September, 2014

Michelle K. Lee
*Deputy Director of the United States Patent and Trademark Office*